(12) United States Patent
Han

(10) Patent No.: US 10,122,705 B2
(45) Date of Patent: Nov. 6, 2018

(54) INTELLIGENT TERMINAL EQUIPMENT AND INFORMATION TRANSMISSION METHOD AND SYSTEM USING THE SAME

(71) Applicants: INVENTEC APPLIANCES (PUDONG) CORPORATION, Shanghai (CN); INVENTEC APPLIANCES CORP., New Taipei (TW); INVENTEC APPLIANCES (JIANGNING) CORPORATION, Nanjing (CN)

(72) Inventor: Jie-Cai Han, Nanjing (CN)

(73) Assignees: Inventec Appliances (Pudong) Corporation, Shanghai (CN); Inventec Appliances Corp., New Taipei (TW); Inventec Appliances (Jiangning) Corporation, Nanjing (CN)

( * ) Notice: Subject to any disclaimer, the term of this patent is extended or adjusted under 35 U.S.C. 154(b) by 212 days.

(21) Appl. No.: 14/698,640

(22) Filed: Apr. 28, 2015

(65) Prior Publication Data
US 2016/0087965 A1    Mar. 24, 2016

(30) Foreign Application Priority Data
Sep. 22, 2014 (CN) .......................... 2014 1 0496039

(51) Int. Cl.
*H04L 29/06* (2006.01)
(52) U.S. Cl.
CPC ........ *H04L 63/083* (2013.01); *H04L 63/0876* (2013.01); *H04L 63/10* (2013.01)

(58) Field of Classification Search
CPC .... H04L 63/083; H04L 63/0876; H04L 63/10
USPC ........................................................... 726/6
See application file for complete search history.

(56) References Cited

U.S. PATENT DOCUMENTS

| | | | |
|---|---|---|---|
| 2012/0100832 A1* | 4/2012 | Mao ..................... | H04L 63/162 455/411 |
| 2015/0046497 A1* | 2/2015 | Campbell, Jr. ....... | G06F 21/645 707/802 |

* cited by examiner

*Primary Examiner* — Kambiz Zand
*Assistant Examiner* — Aubrey H Wyszynski
(74) *Attorney, Agent, or Firm* — Muncy, Geissler, Olds & Lowe, P.C.

(57) ABSTRACT

Intelligent terminal equipment and information transmission method and system using the same are disclosed. The method includes that intelligent terminal equipment reads the local contact information, generates a signature to be an original signature which has a corresponding terminal identifier based on the local contact information, and transmits the original signature and the terminal identifier to the server for saving the original signature and the terminal identifier in the server. The method further includes that intelligent terminal equipment captures the information transmission request, accesses the original signature generated by the local contact information, and transmits a processing information to the server to compare with the saved signature in the server for an identification process, in which the processing information includes the terminal identifier, the transmission information and the original signature. The present invention can improve the security of the information transmission for the intelligent terminal equipment.

10 Claims, 6 Drawing Sheets

INTELLIGENT TERMINAL EQUIPMENT AND INFORMATION TRANSMISSION METHOD AND SYSTEM USING THE SAME

CROSS-REFERENCE TO RELATED APPLICATIONS

The present invention claims benefit and priority of China Patent Application No. CN201410496039.7, filed on Sep. 22, 2014, which is herein incorporated by reference in its entirety.

FIELD OF THE INVENTION

The present invention relates to an information transmission technology, and in particular to an intelligent terminal equipment and information transmission method and system using the same.

BACKGROUND OF THE INVENTION

With the development of society and mobile communications technologies, the intelligent terminal equipment is increasingly becoming an essential feature for people. Through the intelligent terminal equipment, people can get rid of distance limitations for communicating with the people in any corner of the earth with text, voice or video. This greatly improves the work efficiency of people and improves the life quality, but also provides a broad development space for the intelligent terminal equipment. The intelligent terminal equipment commonly includes the mobile phones and other devices.

The intelligent terminal equipment can access the service which is provided by the network. In practice, the intelligent terminal equipment further involves that transmits the important transmission information to the server.

For increasing the information transmission security, the method includes: user transmits the transmission information through the intelligent terminal equipment to the server and the transmission information includes the password. The server receives the transmission information and identifies the password. The server finishes the identification process to perform subsequent process. Based on the different access service, the subsequent process includes that the server sends the information of the intelligent terminal equipment request and performs the information conversion based on the intelligent terminal equipment.

However, if the vendor steals the user's password, and the vendor can access any intelligent terminal equipment with the stolen password to fake the real user to access the corresponding server to reveal the information and result in loss.

In summary, the method of the current intelligent terminal equipment transmits the information has lower security issue.

SUMMARY OF THE INVENTION

It is an objective to provide an intelligent terminal equipment information transmission method which can increase the security of the intelligent terminal equipment information transmission.

It is another objective to provide an intelligent terminal equipment information transmission system which can increase the security of the intelligent terminal equipment information transmission.

It is still an objective to provide an intelligent terminal equipment which can increase the information transmission security.

To realize above objectives, the present invention provides an intelligent terminal equipment information transmission method which includes:

An intelligent terminal equipment is provided for reading a local contact information. The intelligent terminal equipment generates a signature to be an original signature which has a corresponding terminal identifier based on the local contact information and transmits the original signature and the terminal identifier to a server for saving the original signature and the terminal identifier in the server, the original signature saved at the server is a saved signature. The intelligent terminal equipment captures an information transmission request, accesses the original signature generated by the local contact information, and transmits a processing information to the server to compare with the saved signature for performing an identification process, in which the processing information includes the terminal identifier, a transmission information and the original signature.

An intelligent terminal equipment information transmission system includes an intelligent terminal equipment and a server. The intelligent terminal equipment generates a signature to be an original signature based on a local contact information and transmits a processing information which includes a terminal identifier, a transmission information, and the original signature generated by the local contact information to the server. The server receives a saving information from the intelligent terminal equipment to save the original signature which is corresponding to the terminal identifier, the original signature saved at the server is a saved signature. The server finds the saved signature in the server and the original signature which is corresponding to the terminal identifier of the processing information based on the processing information generated by the intelligent terminal equipment. The server determines whether the original signature of the processing information and the saved signature are identical, and finishes the identification process for processing the received transmission information if it is.

An intelligent terminal equipment includes a signature reporting unit, a transmission request capturing unit, and a processing information transmission unit, in which the signature reporting unit reads a local contact information, generates and saves a signature which to be an original signature based on the local contact information and transmits a saving information which includes a terminal identifier and the original signature to the server for saving the original signature corresponding to the terminal identifier. The original signature saved at the server is a saved signature. The transmission request capturing unit captures the information transmission request and transmits to the processing information transmission unit. The processing information transmission unit receives the information transmission request from the transmission request capturing unit, accesses the original signature generated by the local contact information and transmits a processing information to the server to compare with the saved signature for performing an identification process, in which the processing information includes the terminal identifier, a transmission information and the original signature.

According to aforementioned embodiments, the intelligent terminal equipment reads the local contact information, generates the signature to be an original signature which has a corresponding terminal identifier based on the local contact information and transmits the signature and the terminal identifier the server for saving the original signature and the terminal identifier, the original signature saved at the server is a saved signature. When the transmission information is transmitted, the intelligent terminal equipment accesses the original signature which is generated by the local contact information and transmits the processing information to the server to compare with the saved signature for performing the identification process, in which the processing information includes the terminal identifier, the transmission information and the original signature. The intelligent terminal equipment accesses the signature generated by the local contact information and transmits the transmission information to the server to perform the identification process, such that the vendor cannot access the local contact information of the intelligent terminal equipment and the signature. Thus, the transmission information security can be ensured.

BRIEF DESCRIPTION OF THE DRAWINGS

The present invention will be apparent to those skilled in the art by reading the following description of a preferred embodiment thereof with reference to the drawings, in which.

DETAILED DESCRIPTION OF THE PREFERRED EMBODIMENT

For the objective, technical, and advantages of this invention are more clear and understand, the following illustrated examples is accompanying with drawings to describe the present invention in further detail.

In current technology, the user utilizes the intelligent terminal equipment for transmitting the transmission information to the server, and the transmission information includes the password for identification process. If the vendor steals the user's password, and the vendor can pass any intelligent terminal equipment with the stolen password to fake the real user to access the corresponding server to reveal the information and result in loss. In order to solve the problem, in the present invention, the intelligent terminal equipment generates the signature based on the local contact information, and transmits the signature to the server for identification process, such that the vendor cannot access the local contact information of the intelligent terminal equipment, whereby the transmission security is increased.

Figure 1:
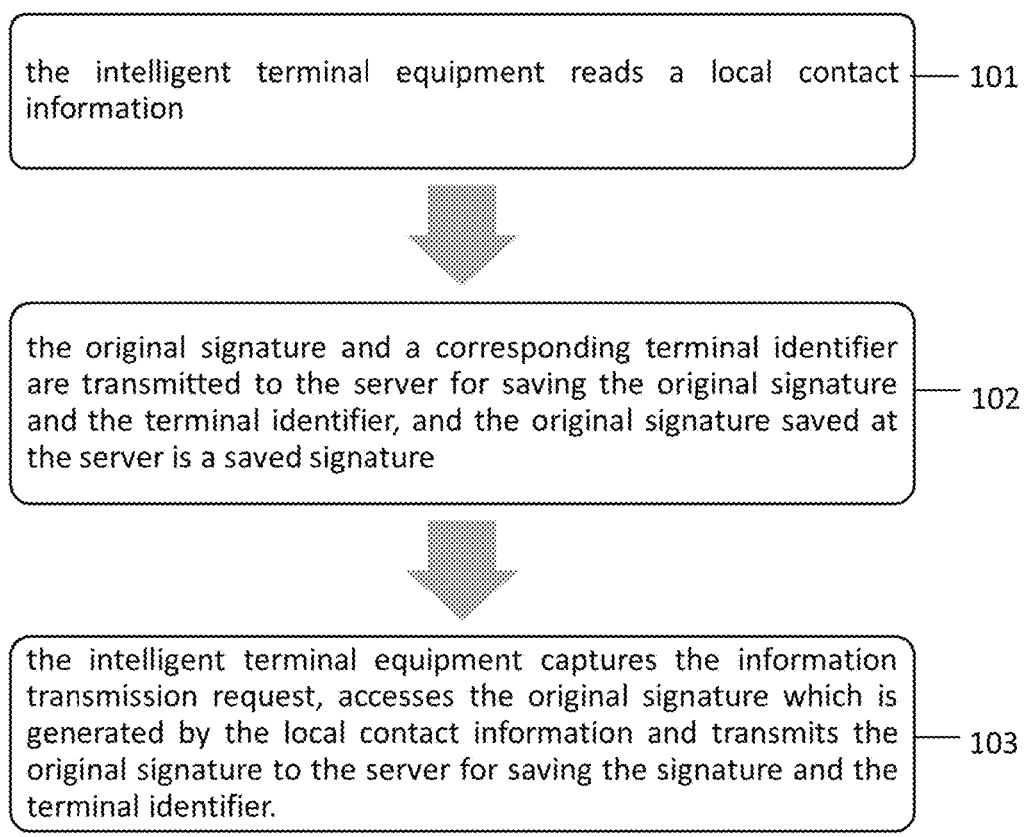
FIG. 1 is a flow chart of showing the intelligent terminal equipment information transmission method in accordance with the present invention.

Please refer to FIG. 1. FIG. 1 shows the flow chart of the intelligent terminal equipment information transmission method, the steps includes:

Step 101: the intelligent terminal equipment reads a local contact information.

Step 102: the intelligent terminal equipment generates a signature to be an original signature which has a corresponding terminal identifier based on the local contact information and transmits the original signature and the terminal identifier to the server for saving the original signature and the a terminal identifier. The original signature saved at the server is a saved signature.

The content of the local contact information for generating the original signature can be arranged based on the requirement; for example, the local contact information includes at least one of a local contact number, a local contact address, and a partial information of the local contact number.

After reading the local contact information, the variety algorithms can be used for generating the original signature through the intelligent terminal equipment, for example, the hash algorithm for calculating the local contact information to obtain the signature through the intelligent terminal equipment. The following is an embodiment of calculated hash signature which utilizes Fowler-Noll-Vo hash function calculation, and the hash algorithm is a well-known prior art technical and it is described in brief description herein. The steps of hash algorithm are S1 to S5 as listing following:

S1: hass=FNV_offset_basis; S2: for each octet_of_data to be hashed; S3: hash=hash×FNV_prime; S4: hash=hashXOR octet_of_data; S5: return hash.

Herein, the hash is a 64-bits unsigned number, an initial value is FNV_offset_basis, that is, 14695981039346656037 (the hexadecimal represents 0xcbf29ce484222325).

FNV_prime is also a 64-bit unsigned number, which represents 1099511628211 (the hexadecimal represents 0x100000001b3).

Octet_of_data is an original data for calculating the hash signature and is a 8-bit, that is, each one byte of the local contact information.

Once every loop operation is first multiplied current hash variables and FNV_prime, and then hash variable and calculated original byte are operated with exclusive or gate (XOR).

After calculating all inputs, the result is 64 byte hash which is the last signature.

The steps 101-102 are the flow processes of the pre-reporting the signature. After the intelligent terminal equipment accessed the client application, the steps 101-102 can be executed in the first installation of the client application. Then, the intelligent terminal equipment can transmit the transmission information based on the original signature.

Step 103: the intelligent terminal equipment captures the information transmission request, accesses the original signature which is generated by the local contact information and transmits the original signature to the server for saving the signature and the terminal identifier.

After the server received the processing information, an identification process is performed to the saved signature through the intelligent terminal equipment and the identification process includes:

The server finds the saved signature which is corresponding to the terminal identifier of the processing information.

The server determines whether the signature of the processing information and the saved signature are identical, and finishes the identification process for processing the received transmission information if it is, else, the identification process is false.

After the identification process, the server can be carried out subsequent processing. Depending on the access service, a variety of subsequent processing comprises: the server sends an information for the intelligent terminal equipment request, the server performs information conversion based on the intelligent terminal equipment request, in which the information conversion is continuous payment processing.

To simplify operation, after generating the original signature, the intelligent terminal equipment can save the generated original signature in aforementioned step 102. Correspondingly, the step 103 of the intelligent terminal equipment accesses the original signature generated by the local contact information includes: the intelligent terminal equipment accesses the saved signature to be the original signature as generated by the local contact information, or the intelligent terminal equipment reads the local contact information and generates the signature based on the local contact information to be the original signature as generated by the local contact information.

In order to increase the security, when the local contact information is changed, the saved signature in the server can be changed synchronously. Specifically:

The intelligent terminal equipment acquires a changed local contact information and accordingly generates a first signature based on the changed local contact information.

The intelligent terminal equipment accesses the saved original signature, transmits a updating request includes the original signature, the first signature and the terminal identifier to the server, and updates the saved original signature with the first signature.

The server finds the saved signature which is corresponding to the terminal identifier of the updating request to be a second signature.

The sever determines whether the original signature and the second signature are identical, and updates the saved second signature with the first signature, else, the first signature without updating.

In the present invention, the intelligent terminal equipment reads the local contact information which has a corresponding terminal identifier based on the signature generated by the local contact information to be an original signature and transmits the original signature and the terminal identifier to the server for saving the original signature and the terminal identifier. The original signature saved at the server is a saved signature. When the transmission information is to be transmitted in subsequent process, the intelligent terminal equipment accesses the signature which is generated by the local contact information and transmits the processing information to the server to combine with the saved signature for performing an identification process, in which the processing information includes the terminal identifier, the transmission information and the signature. The intelligent terminal equipment generates the original signature based on the local contact information and transmits the transmission information to the server for performing the identification process, such that the vendor cannot access the local contact information from the intelligent terminal equipment and further cannot access the signature. Thus, the transmission information security can be ensured.

The embodiment of the present invention is illustrated by FIG. 2 to FIG. 5 as follows.

Figure 2:
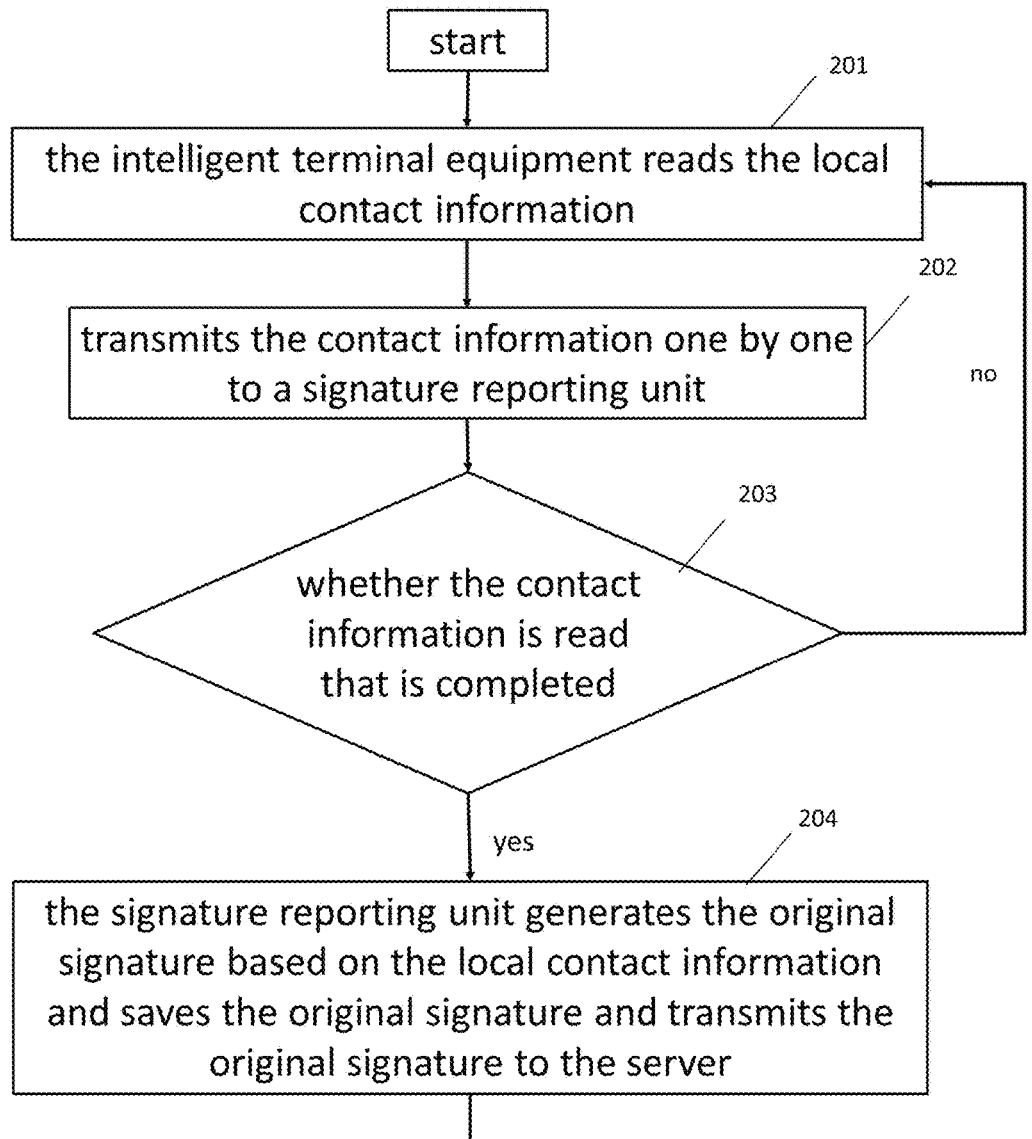
FIG. 2 is a flow chart of showing the signature reporting method in accordance with the present invention.

Please refer to FIG. 2. FIG. 2 is a flow chart of showing the signature reporting method in accordance with the present invention, which is the process that the intelligent terminal equipment previously transmits the original signature generating based on the local contact information to the server, the steps includes as following:

Step 201: the intelligent terminal equipment reads the local contact information.

As shown in Table 1, Table 1 shows the embodiment of the intelligent terminal equipment that reads the local contact information, in which the local contact information includes a contact name, a local contact number and a local contact address.

TABLE 1 contact information table

| Contact name | Contact number | Contact address |
| --- | --- | --- |
|  |  |  |
|  |  |  |

Step 202: the intelligent terminal equipment reads the contact information and transmits the contact information one by one to a signature reporting unit.

Step 203: the intelligent terminal equipment determines whether the contact information is read that is completed, if it is, then step 204 is performed, otherwise, step 201 is performed.

Step 204: the signature reporting unit of the intelligent terminal equipment generates the original signature which has a corresponding terminal identifier based on the local contact information and saves the original signature and transmits the original signature and the terminal identifier to the server.

Figure 3:
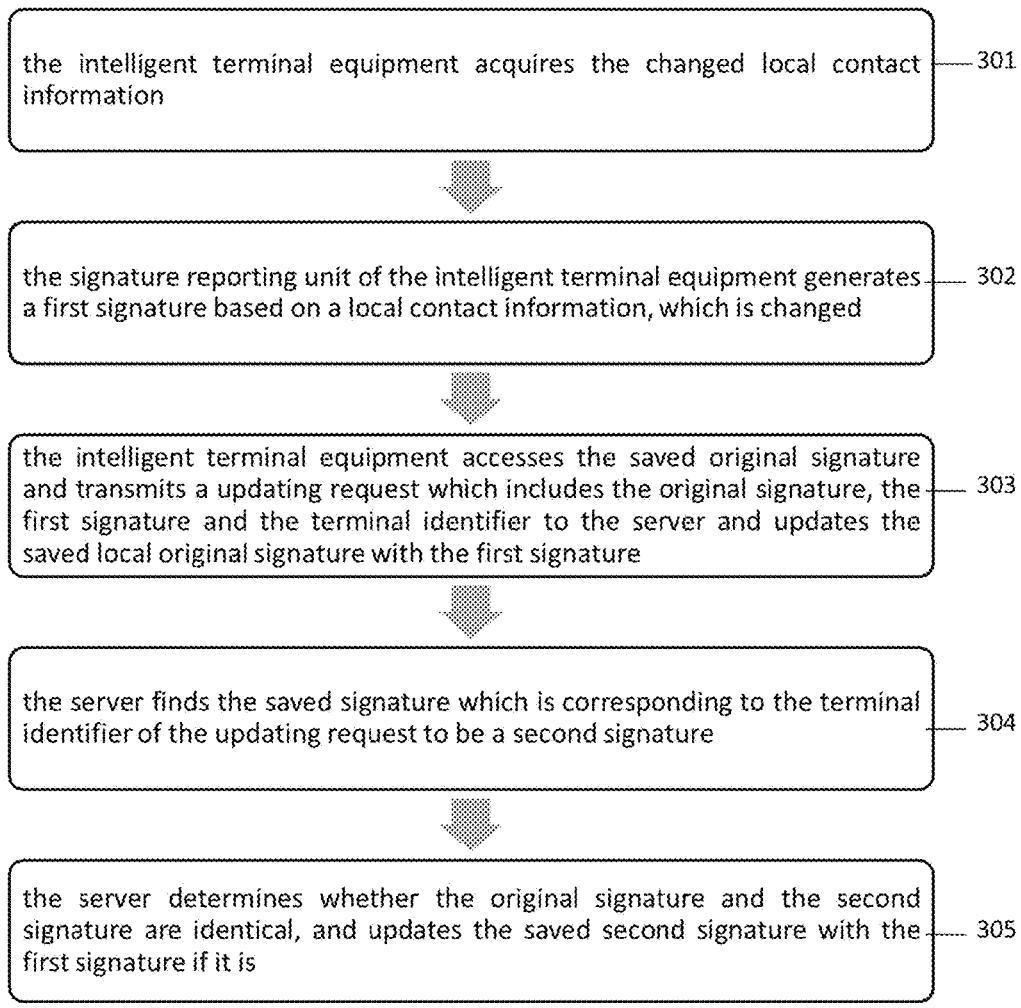
FIG. 3 is a flow chart of showing the signature changed method in accordance with the present invention.

Please refer to FIG. 3. FIG. 3 is a flow chart of showing the signature changed method in accordance with the present invention. The method includes the steps of:

Step 301: the intelligent terminal equipment acquires the changed local contact information.

The intelligent terminal equipment can actively or passively acquire the changed local contact information. Specifically, the intelligent terminal equipment can monitor the local contact information, if the local contact information is to be changed, the signature changed is to be executed. Further, when the user updates the local contact information, the signature is to be updated and the intelligent terminal equipment performs the signature update.

Step 302: the signature reporting unit of the intelligent terminal equipment generates a first signature based on a local contact information, which is changed.

Step 303: the intelligent terminal equipment accesses the saved original signature and transmits a updating request which includes the original signature, the first signature and the terminal identifier to the server and updates the saved original signature with the first signature.

Step 304: the server finds the saved signature which is corresponding to the terminal identifier of the updating request to be a second signature.

Step 305: the server determines whether the original signature and the second signature are identical, and updates the saved second signature with the first signature if it is.

Figure 4:
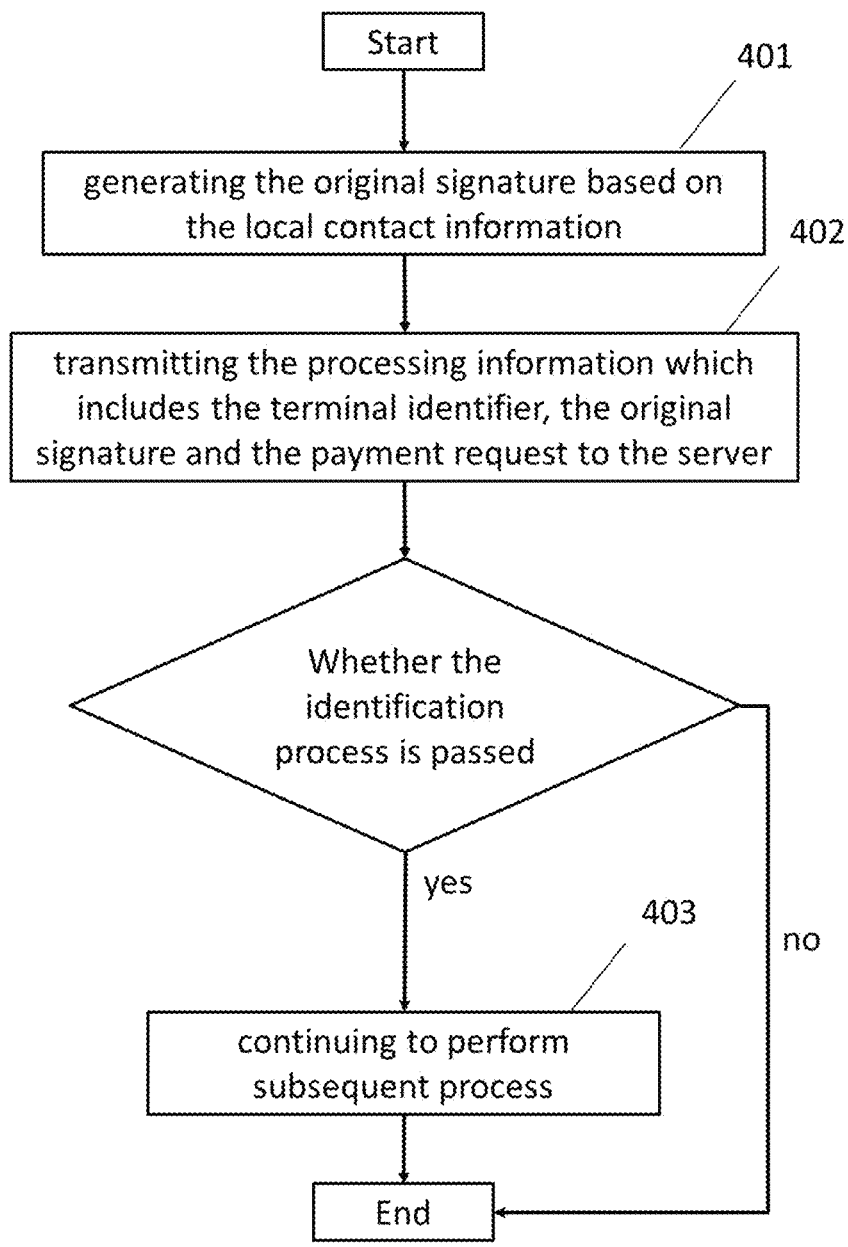
FIG. 4 is a payment flow chart of the intelligent terminal equipment based on the signature in accordance with the present invention.

Please refer to FIG. 4. FIG. 4 is a payment flow chart of the intelligent terminal equipment based on the signature and the steps of includes as follows:

Step 401: the intelligent terminal equipment reads the local contact information and generates the original signature based on the local contact information.

Step 402: the intelligent terminal equipment transmits the processing information which includes the terminal identifier, the original signature and the payment request to the server.

Herein, the processing information is payment request.

The server receives the processing information and combine with the saved signature for performing an identification process through the intelligent terminal equipment, if the identification process is passed, the intelligent terminal equipment continues to payment process and if the identification fails, then refused to payment.

Step 403: the intelligent terminal equipment continues to perform subsequent process based on the identification result.

Figure 5:
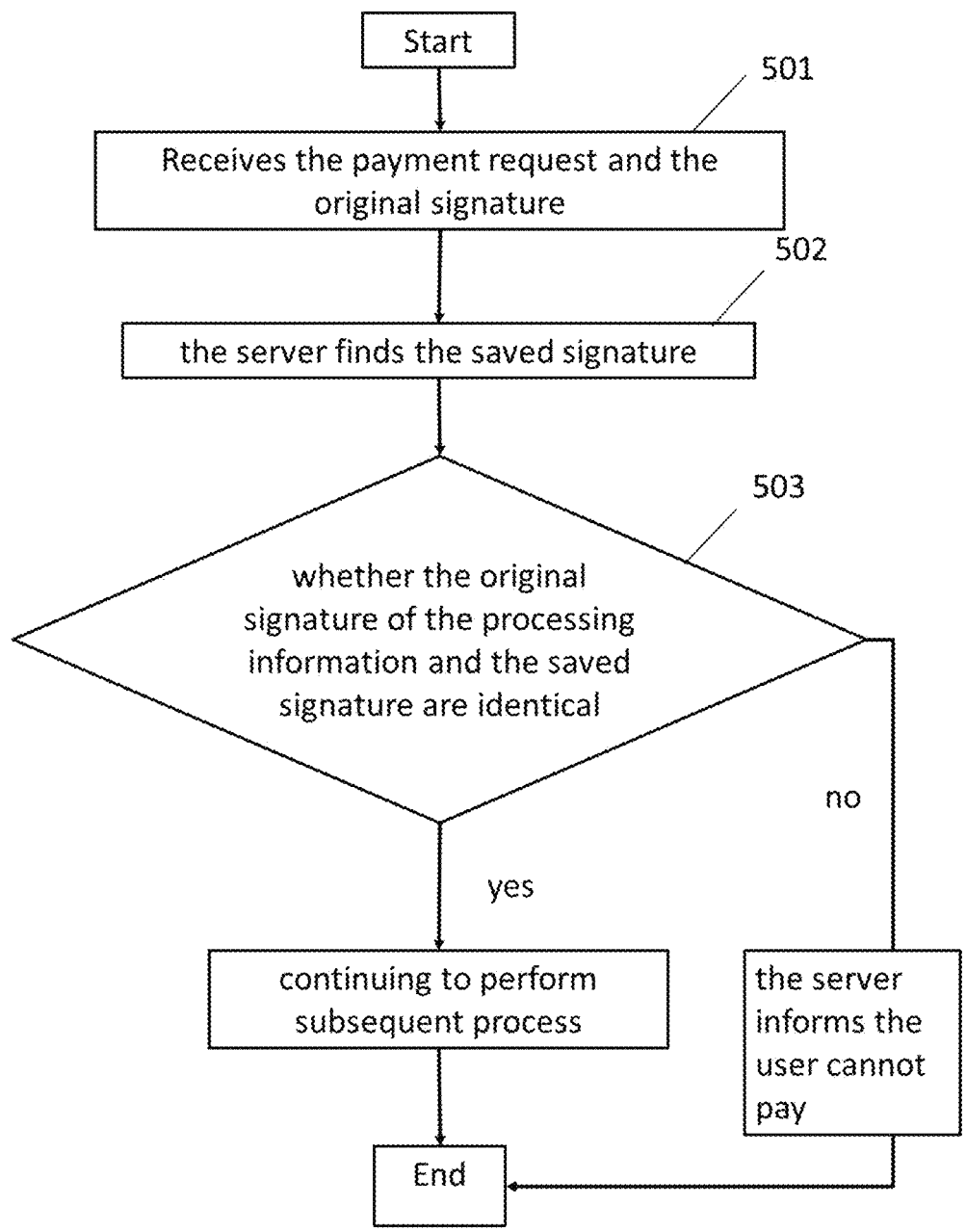
FIG. 5 is a payment flow chart of the server based on the signature in accordance with the present invention.

Please refer to FIG. 5. FIG. 5 is a payment flow chart of the server based on the signature and the steps of includes as follows:

Step 501: the server receives the processing information from the intelligent terminal equipment and the processing information includes the terminal identifier, the payment request and the original signature.

Step 502: the server finds the saved signature and the original signature which is corresponding to the terminal identifier through the intelligent terminal equipment.

Step 503: the server determines whether the original signature of the processing information and the saved signature are identical, if it is, the server finishes the identification process to payment process, else, the server informs the user cannot pay, and ends the payment process.

Figure 6:
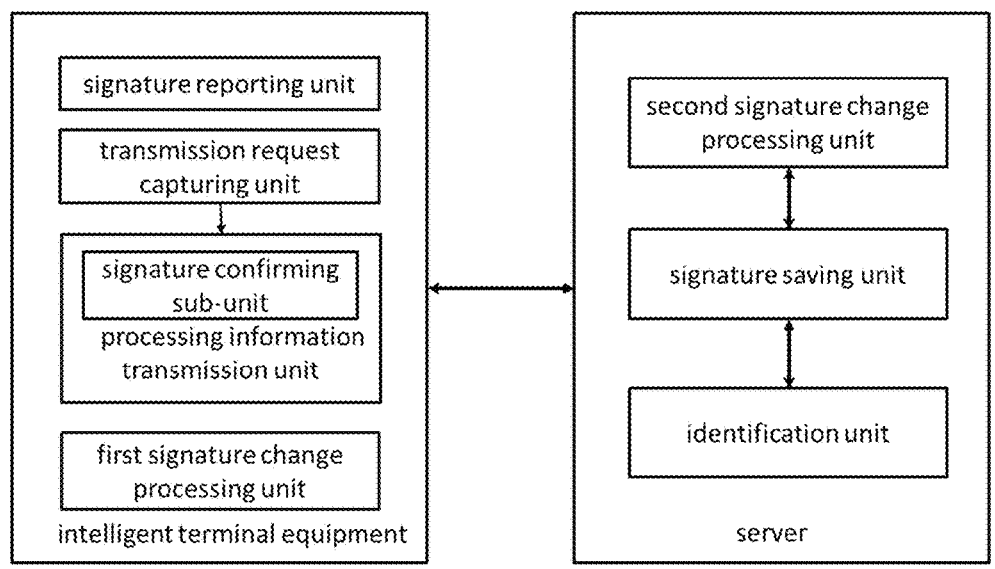
FIG. 6 is schematic diagram of the intelligent terminal equipment information transmission system in accordance with the present invention.

Please refer to FIG. 6. FIG. 6 is schematic diagram of the intelligent terminal equipment information transmission system which includes the intelligent terminal equipment and the server.

The intelligent terminal equipment generates a signature to be an original signature based on a local contact information and transmits a processing information which includes a terminal identifier and the original signature generated by the local contact information to the server.

The server receives a saving information from the intelligent terminal equipment to save the original signature which is corresponding to the terminal identifier. The original signature saved at the server is a saved signature. The server finds the saved signature in the server and the original signature which is corresponding to the terminal identifier of the processing information based on the processing information generated by the intelligent terminal equipment. The server determines whether the original signature of the processing information and the saved signature are identical, if it is, the server finishes the identification process for processing the received transmission information.

Preferably, the intelligent terminal equipment includes a signature reporting unit, a transmission request capturing unit, and a processing information transmission unit, and the server includes a signature saving unit and an identification unit.

The signature reporting unit reads the local contact information, generates a signature based on the local contact information and transmits the saving information which includes the terminal identifier and the original signature to the server.

The transmission request capturing unit captures the information transmission request to transmit to the processing information transmission unit.

The signature saving unit receives the saving information from the intelligent terminal equipment and saves the original signature corresponding to the terminal identifier. The original signature saved at the server is a saved signature.

The identification unit receives the processing information from the intelligent terminal equipment, finds the saved signature in the server and the original signature which is corresponding to the terminal identifier of the processing information determines whether the original signature of the processing information and the saved signature are identical, if it is, the identification unit finishes the identification process for processing the received transmission information.

Preferably, the intelligent terminal equipment further includes a first signature change processing unit and the server includes a second signature change processing unit.

The first signature change processing unit acquires the local contact information which is changed and generates a first signature based on a changed contact information. The first signature change processing unit accesses the original signature saved in the intelligent terminal equipment. The first signature change processing unit transmits a updating request including the original signature, the first signature and the terminal identifier to the server and updates the original signature saved in the intelligent terminal equipment with the first signature.

The second signature change processing unit receives the updating request from the first signature change processing unit, finds the saved signature which is corresponding to the terminal identifier of the updating request to be a second signature. The second signature change processing unit determines whether the original signature and the second signature are identical, if it is, The second signature change processing unit updates the saved second signature with the first signature.

Preferably, the signature reporting unit generates the original signature and further saved the original signature. The processing information transmission unit includes a signature confirming sub-unit to access the original signature saved in the intelligent terminal equipment to be the original signature generated by the local contact information, or to read the local contact information and generate the signature based on the local contact information to be the original signature generated by the local contact information.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An intelligent terminal equipment information transmission method, comprising:

reading a local contact information by a signature reporting unit of an intelligent terminal equipment;

generating a signature to be an original signature by the signature reporting unit of the intelligent terminal equipment, the original signature has a corresponding terminal identifier based on the local contact information and transmitting the original signature with the corresponding terminal identifier to a server for saving the original signature with the corresponding terminal identifier in the server, the original signature with the corresponding terminal identifier saved in the server being a saved signature with the corresponding terminal identifier;

capturing and transmitting an information transmission request by a transmission request capturing unit;

receiving the information transmission request from the transmission request capturing unit and accessing the original signature generated by the local contact information by a processing information transmission unit;

comparing a processing information with the saved signature with the corresponding terminal identifier for performing an identification process by the server, wherein the processing information includes the terminal identifier, a transmission information and the original signature, wherein the server further comprising:
finding the saved signature and the original signature which is corresponding to the terminal identifier of the processing information; and
determining whether the original signature of the processing information and the saved signature with the corresponding terminal identifier are identical, and finishing the identification process for processing the received transmission information if it is.

2. The intelligent terminal equipment information transmission method according to claim 1, further comprising:
acquiring the local contact information which is changed and accordingly generating a first signature based on the changed local contact information;
accessing the saved original signature, transmitting an updating request including the original signature, the first signature and the terminal identifier to the server, and updating the saved original signature with the first signature in the intelligent terminal equipment;
finding the saved signature which is corresponding to the terminal identifier of the updating request to be a second signature; and
determining whether the original signature and the second signature are identical, and updating the saved second signature with the first signature if it is.

3. The intelligent terminal equipment information transmission method according to claim 1, wherein the step of the intelligent terminal equipment accessing the original signature generated by the local contact information comprises:
accessing the signature saved by the intelligent terminal equipment to be the original signature generated by the local contact information, or reading the local contact information and generating the signature based on the local contact information to be the original signature generated by the local contact information.

4. The intelligent terminal equipment transmission method according to claim 3, wherein the local contact information includes one of a local contact number, a local contact address, and a partial information of the local contact number.

5. The intelligent terminal equipment transmission method according to claim 1, wherein the step of the intelligent terminal equipment generating the signature based on the local contact information comprises:
performing a hash algorithm to calculate the local contact information for obtaining the original signature.

6. An intelligent terminal equipment information transmission system, comprising:
a signature reporting unit of an intelligent terminal equipment is provided for reading a local information to generate a signature to be an original signature based on a local contact information and transmitting a processing information including a terminal identifier, a transmission information and the original signature;
a transmission request capturing unit of the intelligent terminal equipment is provided for capturing an information request;
a processing information transmission unit of the intelligent terminal equipment is provided for receiving the information request from the transmission request capturing unit and accessing the original signature generated by the local contact information;
the server is provided for receiving the processing information and comparing the processing information with the saved signature, and then the server is performed with an identification process, wherein the identification process comprises:
the server is provided for finding the saved signature in the server and the original signature which is corresponding to the terminal identifier of the processing information based on the processing information generated by the intelligent terminal equipment; and
the server is provided for determining whether the original signature of the processing information and the saved signature are identical, and finishes the identification process for processing the received transmission information if it is.

7. The system according to claim 6, wherein the intelligent terminal equipment further includes a first signature change processing unit and the server includes a second signature change processing unit, wherein
the first signature change processing unit is provided for acquiring the local contact information which is changed, accordingly generating a first signature based on the changed local contact information, accessing the original signature saved in the intelligent terminal equipment, transmitting an updating request including the original signature, the first signature and the terminal identifier to the server, and updating the original signature saved in the intelligent terminal equipment with the first signature; and
the second signature change processing unit is provided for receiving the updating request for the first signature change processing unit, finding the saved signature which is corresponding to the terminal identifier of the updating request to be a second signature, determining whether the original signature and the second signature are identifier, and updating the saved second signature with the first signature if it is.

8. An intelligent terminals equipment includes a signature reporting unit, a transmission request capturing unit and a processing information transmission unit; wherein the signature reporting unit is provided for reading a local contact information, generating and saving a signature to be an original signature based on the local contact information, and transmitting a processing information including a terminal identifier and the original signature to a server the original signature corresponding to the terminal identifier, the original signature saved in the server is a saved signature;
the transmission request capturing unit is provided for capturing the information transmission request and transmitting to the processing information transmission unit; and
the processing information transmission unit is provided for receiving the information transmission request from the transmission request capturing unit, accessing the original signature generated by the local contact information, and transmitting the processing information to the server to compare with the saved signature for performing an identification process, wherein the processing information includes the terminal identifier, a transmission information and the original signature.

9. The intelligent terminal equipment according to claim 8, further comprising a first signature change processing unit to acquire the local contact information which is changed, to generate a first signature based on the changed local contact information, to access the original signature saved in the intelligent terminal equipment, to transmit a updating request including the original signature, the first signature and the terminal identifier to the server, and to update the original signature saved in the intelligent terminal equipment with the first signature.

10. The intelligent terminal equipment according to claim 8, wherein the processing information transmission unit includes a signature confirming sub-unit to access the signature saved in the intelligent terminal equipment to be the original signature generated by the local contact information of the intelligent terminal equipment, or to read the local contact information of the intelligent terminal equipment and generate the signature based on the local contact information to be the original signature generated by the local contact information.

* * * * *